United States Patent [19]
Kim

[11] Patent Number: 5,825,614
[45] Date of Patent: Oct. 20, 1998

[54] COMPACT PERSONAL COMPUTER WITH LCD MONITOR

[75] Inventor: Tae-Sang Kim, Suwon, Rep. of Korea

[73] Assignee: Samsung Electronics Co., Ltd., Suwon, Rep. of Korea

[21] Appl. No.: 710,539

[22] Filed: Sep. 19, 1996

[30] Foreign Application Priority Data

Jan. 17, 1996 [KR] Rep. of Korea .................... 1996-0818
Apr. 23, 1996 [KR] Rep. of Korea .................. 1996-12333

[51] Int. Cl.$^6$ ...................................... G06F 1/16
[52] U.S. Cl. .......................... 361/683; 261/680; 261/681; 381/88; D14/114
[58] Field of Search ..................... 361/680–686; 364/708.1; 381/24, 87, 88; D14/113, 114; 312/223.2; G06F 1/16

[56] References Cited

U.S. PATENT DOCUMENTS 4,781,422 11/1988 Kimble .
4,832,419 5/1989 Mitchell et al. .
4,926,365 5/1990 Hsieh .
5,157,585 10/1992 Myers .
5,175,672 12/1992 Conner et al. .
5,243,549 9/1993 Oshiba .
5,251,102 10/1993 Kimble .
5,390,007 2/1995 English et al. .
5,430,607 7/1995 Smith .
5,502,616 3/1996 Maguire Jr. .
5,519,572 5/1996 Luo .
5,646,820 7/1997 Honda et al. ............................ 361/683

*Primary Examiner*—Lynn D. Feild
*Attorney, Agent, or Firm*—Robert E. Bushnell, Esq.

[57] ABSTRACT

A compact personal computer is constructed with a microcomputer body, a monitor rotatably mounted on the microcomputer body, a keyboard coupled to a front panel of the microcomputer body by either a bracket or a hinge, and a set of speakers rotatably attached to opposite side walls of the body of the microcomputer. The computer can be used conveniently without a space limit and easily conveyed because the keyboard and the speakers may be folded to the body of the microcomputer when not in use to form a single compact and easily carried unitary structure.

28 Claims, 7 Drawing Sheets

PRIOR ART

COMPACT PERSONAL COMPUTER WITH LCD MONITOR

CROSS-REFERENCE TO RELATED APPLICATION

This application makes reference to, incorporates the same herein, and claims all benefits accruing under 35 U.S.C. §119 from an application for A COMPACT PERSONAL COMPUTER WITH LCD MONITOR earlier filed in the Korean Industrial Property Office on Jan. 17, 1996, and there duly assigned Ser. No. 0818/1996.

BACKGROUND OF THE INVENTION

1. Technical Field

The present invention relates to a compact personal computer, and more particularly to a personal computer integrating a keyboard, a flat screen video (e.g., a liquid crystal display) monitor, speakers and a microcomputer body into a single unitary structure.

1. Background Art

Since "ENIAC", the first generation of computers that was enormous, as large as a 3-story-building with vacuum tubes, modern computer systems have been developed and reduced dramatically in size so as to be suitable to be used on a desk. Desktop personal computers (PC) are designed to remain in a predetermined work space and typically include separate processor, disk drive, monitor and keyboard components. Smaller and highly portable computer systems such as "laptop" or "notebook" computer disclosed, for example, in U.S. Pat. No. 5,175,672 for Housing Apparatus For Portable Computer Systems issued to Conner et al., U.S. Pat. No. 5,243,549 for Portable Computer With Display In Pivotally Mounted Cover issued to Oshiba, U.S. Pat. No. 5,251,102 for Computer And Computer Terminals With Depending, Supporting Ridge issued to Kimble, and U.S. Pat. No. 5,390,075 for Electronic Apparatus With Flexible Cable Interconnect Having Independently Movable Member Supported On Tab Portions issued to English et al., are constructed for compact transportation from location to location for use by the operator and typically include a fully integrated processor, disk drive and keyboard structure in a clam shell case serving as a housing to which a liquid crystal display (LCD) monitor is pivoted for tilt-up use. At least one problem that I have observed with respect to the "clam shell" housing construction is that the distance between the keyboard and the LCD monitor is limited and can not be varied to accommodate individual user preference because the LCD monitor and the keyboard are mechanically connected.

Other portable computer systems that fall between the larger desktop computer and the much smaller portable notebook computer are disclosed, for example, in U.S. Pat. No. 4,832,419 for Adjustable Display Panel For Portable Computer issued to Mitchell et al., and U.S. Pat. No. 5,157,585 for Compact AC-Powerable Portable Computer Having A CPU And Expansion Bay In An Upper Housing Pivotally Attached To A Lower Housing, issued to Myers, in which a main housing structure contains both the processing system and the disk drive system. In Mitchell '419, a separate LCD screen housing structure is pivotally connected to the main housing over a front side portion, and a keyboard is removably secured to the main housing over the front side of the LCD screen housing. When in use, the keyboard is unlatched and removed from the front side of the main housing and placed on the desk. The LCD screen housing is then swung upwardly and somewhat forwardly relative to the main housing to a use position in which the LCD screen may be forwardly or rearwardly tilted to accommodate the individual user's angle preference. When not in use, the LCD screen housing is tilted back to an upright position and then swung downwardly and inwardly back to its storage position against the front side of the main housing. The keyboard is then re-latched to the main housing, over the front side of the LCD screen housing in order to return the portable computer to its storage and transport orientation. In Myers '585, on the other hand, both the processing system including the disk drive system and the LCD screen are incorporated into a single housing structure having a base containing a disk drive system and an upper housing supporting a processing system and a LCD screen in which the upper housing is permitted to pivot relative to the base to accommodate the individual user's angle preference.

As computer systems advance with significant processing and storage capabilities including multi-media in which the computer user is now able to obtain full benefits of high speed voice and data processing, a specially designed portable housing structure is desired to accommodate the full use of speakers so as to allow the user to listen to high fidelity music, to watch television and movies while enhancing the portability and transportability of such multi-media personal computers. As described earlier, conventional desktop personal computers require separate monitor, speakers and keyboard that operate in connection with a central processing unit. For this reason, all separate hardware components such as a monitor, speakers and a keyboard must be connected to a microcomputer body, and all of which occupy a significant work area on a desk. Moreover, it is necessary to purchase respectively a video card such as a MPEG board or the like so as to process high speed video signals. Another problem encountered with conventional desktop computers is that it is difficult for computer users to transport desktop computers from one location to another. The computer users must disconnect all separate hardware components from the computer for transportation and then reconnect all the separate hardware components upon arrival, all of which may cause systematic errors or interruption of the individual component when re-connected improperly. Conventional notebook personal computers, on the other hand, are physically restricted to accommodate built-in speakers for multi-media use. Accordingly, a specially designed portable housing structure for personal computers is required to best accommodate recent advances in computer technology.

SUMMARY OF THE INVENTION

Accordingly, it is therefore an object of the present invention to provide an improved personal computer.

It is another object to provide a housing for a compact personal computer, integrating the structures of numerous peripheral devices for the computer into a single portable structure.

It is yet another object to provide a compact personal computer having all individual hardware components such as a monitor, speakers and a keyboard combined into the structure of a single portable housing permitting easy transportation from one location to another between uses.

It is still another object to provide an easily transportable personal computer equipped with most of the commonly sought computer peripheral devices.

It is still yet another object to integrate a personal computer and a plurality of peripheral devices into the structure of a single, deployable portable housing.

It is another object to provide a computer equipped with numerous peripheral devices, with a structure that facilitates quick deployment of those devices prior to use and quick packaging of those devices within the housing of the computer after that use.

These and other objects can be achieved by a compact personal computer constructed with a single portable structure forming a housing for a main computer body, a keyboard, a cover for a visual monitor supporting a flat screen, and a pair of speakers. According to a first embodiment of the present invention, the main computer body is constructed to include first hinges installed at a rear end of its top surface for pivotally mounting the cover of the monitor section to the rear end, second hinges installed at a bottom end of its front panel for pivotally mounting the keyboard, and third hinges installed in respective receiving portions formed on each side panel for pivotally mounting a pair of speakers such that the cover of the monitor section, the keyboard and the speakers are pivotable between an open position for use and a closed position after use for ease of transportation from one location to another location. A first locking mechanism including a hook and a release button formed on the cover for the monitor and a corresponding groove formed on the main computer body and a second locking mechanism including a pair of hooks and release buttons formed on the keyboard and corresponding grooves formed on the front panel of main computer body, are installed respectively to secure the cover monitor section and keyboard to the main computer body in the state of readiness for facile transportation.

According to a second embodiment of the present invention, the main computer body is specially constructed to include first hinges installed at a rear end of its top surface for pivotally mounting the cover of the monitor section to the rear end, second hinges installed in respective receiving portions formed on each side panel for pivotally mounting a pair of speakers such that the cover of the monitor section and the speakers are pivotable between an open position for use and a closed position after use for facilitating transportation of the main computer body, and a pair of brackets each having a guide groove and a stop for guiding the keyboard into position when the keyboard is inserted into the brackets such that the keyboard is removable from the main computer body for use. A first locking mechanism including a hook and a release button formed on the cover of the monitor section and a corresponding groove formed on the main computer body and a second locking mechanism including a pair of hooks and release buttons formed on the brackets and corresponding grooves formed on the side of keyboard, are installed respectively to secure the cover for the monitor and the keyboard to the main computer body in the state of readiness for ease of transportation.

According to a third embodiment of the present invention, the main body of the computer is constructed with respective side panels containing concave, U-shape recesses for accommodating a pair of speakers, first hinges installed at a rear end of its top surface for pivotally mounting the cover of the monitor section to the rear end, second hinges installed at a bottom end of its front panel for pivotally mounting the keyboard on the front panel of the main body, and third hinges installed at respective distal ends of the side panels of the main body for pivotally mounting a pair of pivotal arms supporting box-shaped speakers extending therefrom so that the cover of the monitor section, the keyboard and the speakers are pivotable between open positions for use and closed positions after such use in order to ease of transportation of the computer from one location to another location. A first locking mechanism including a hook and a release button formed on the cover monitor section and a corresponding groove formed on the main computer body and a second locking mechanism including a pair of hooks and release buttons formed on the keyboard and corresponding grooves formed on the front panel of main computer body, are installed respectively to secure the cover for the monitor and the keyboard to the main body of the computer in readiness for transportation between uses of the computer.

In all three embodiments of the present invention, a handle may be formed on at least one side panel of the main computer body is provided to allow the user to grasp and carry the compact personal computer for transportation from one location to another location. The handle may be constructed in a form of either an upwardly sliding recess, or groove, formed as part of the main computer body to accommodate the insertion of the user's hand or a heavy duty leather or plastic strap connected to the side panel of the main computer body by respective fixed end bases in order to allow the user to grasp and carry the housing of the compact personal computer during transportation.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
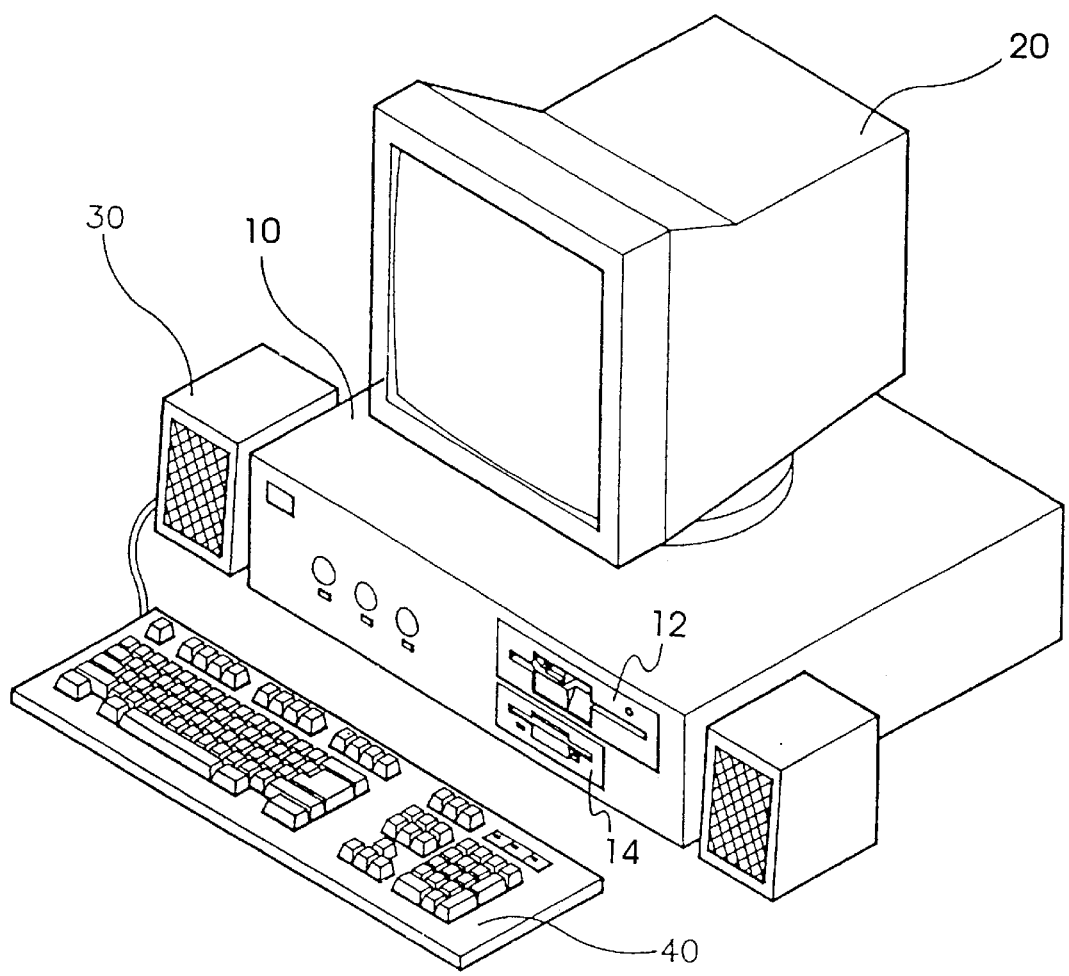
FIG. 1 is a perspective view of a hypothetical representation of a conventional desktop personal computer.

Referring now to the drawings, FIG. 1 illustrates a hypothetical conventional multi-media personal computer typically available in the market today. The conventional multimedia personal computer includes a main computer body 10, output devices such as a monitor 20 and a pair of speakers 30, and input devices such as a keyboard 40 and a mouse (not shown). The main computer body 10 includes a central processing unit (not shown) and auxiliary memory devices such as a 5.25" floppy disk drive 12, a 3.5" floppy disk drive 14 and a hard disk drive (not shown). Various light emitting diodes (LED) are installed in floppy disk drives 12 and 14, respectively, to indicate the operational status of those drives.

Figure 2:
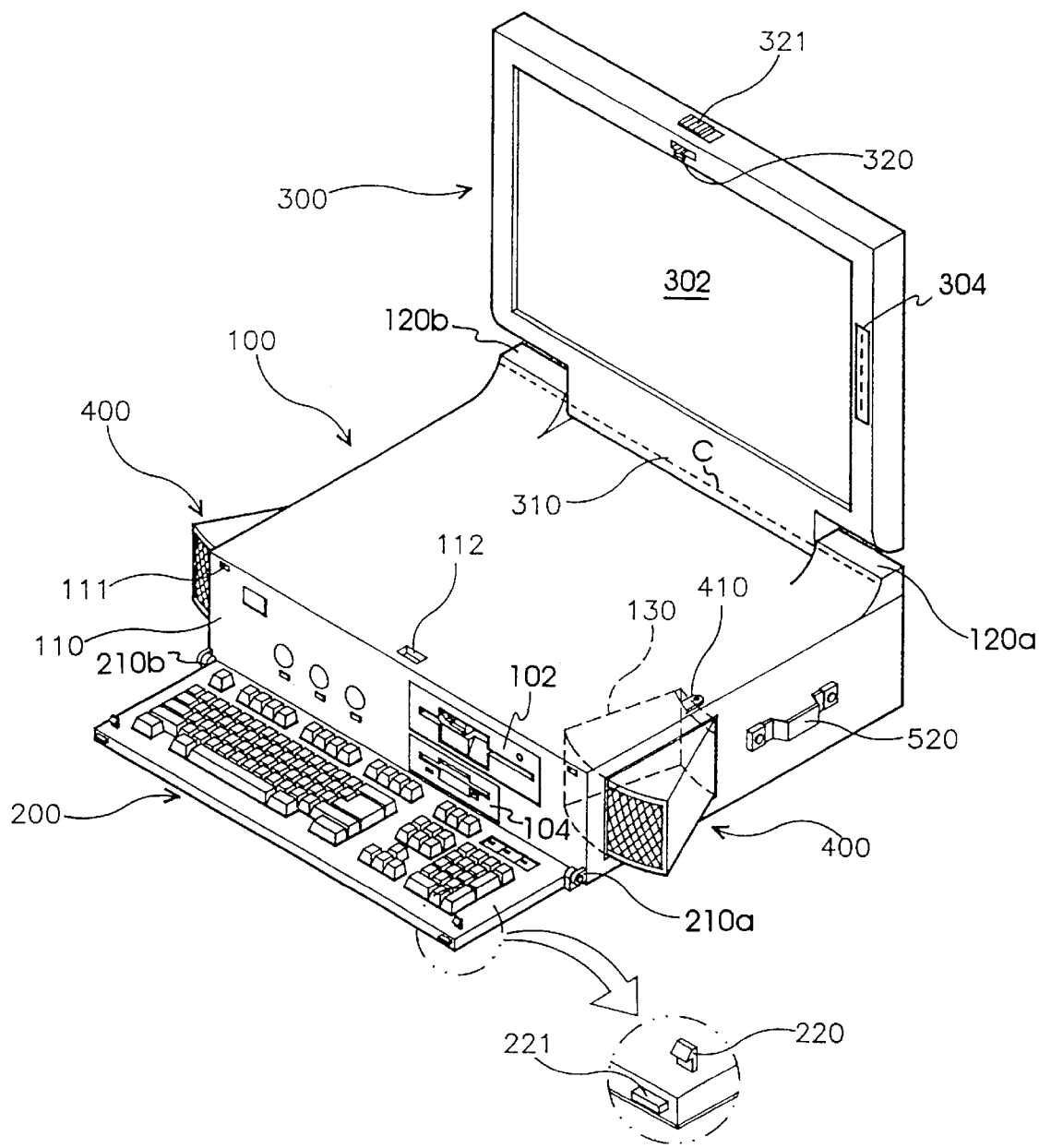
FIG. 2 is a perspective view illustrating a compact personal computer constructed according to the principles of the present invention as one embodiment.

Turning now to FIG. 2 which illustrates a novel compact personal computer constructed as one preferred embodiment of the present invention. The compact personal computer may be constructed with a main computer body 100, a keyboard 200, a cover monitor section 300 including a flat screen 302 mode preferably of a liquid crystal display (LCD) and an audio generation device, i.e., a pair of speakers 400 all integrated in a single specially designed portable housing structure. The main computer body 100 contains therein the usual central processing unit (not shown) and auxiliary memory devices such as a 5.25" floppy disk drive 102, a 3.5" floppy disk drive 104, or alternatively a tape drive or CD-ROM magazine drive, and the hard disk drive (not shown), but is specially constructed to include first hinge portions 120a, 120b installed at a rear end of its top surface for pivotally mounting the cover monitor section 300 to the rear end such that the cover monitor section 300 is pivotable between an open position in which the flat screen 302 is exposed for use and a closed position in which the cover monitor section 300 covers the top surface of the main computer body 100. The main computer body 100 also includes second hinges 210a, 210b installed at a bottom end of its front panel 110 for pivotally mounting the keyboard 200 such that the keyboard 200 is pivotable between an open position in which the keyboard 200 is exposed for use and a closed position in which the keyboard 200 covers the front panel 110 of the main computer body 100. Additionally, the main computer body 100 further includes third hinges 410 internally installed in respective receiving portions 130 on each side panel for pivotally mounting a pair of speakers 400 such that the speakers 400 are pivotable between an open position when the speakers 400 are pulled outwardly from their respective receiving portions 130 by the computer user in which the speakers 400 protrude therefrom for use and a closed position when the speakers 400 are pushed inwardly into their respective receiving portions 130 by the computer user in which the speakers 400 cover the receiving portions 130 of the respective side panel of the main computer body 100. The compact personal computer as constructed according to this preferred embodiment also has a handle 520 on at least one of the side panels of the main computer body 100 in order to allow the computer user to grasp and provide portability to the entire assembly of the computer system. Alternatively, a tilt-up carrying handle may be pivotally provided on the side panel of the main computer body 100 so that the portable personal computer may be readily grasped and manually carried by the computer user.

As shown in FIG. 2, the monitor cover section 300 is provided with a flat screen 302 for providing a visual display of information and has a corresponding hinge member 310 installed between both the respective first hinge portions 120a, 120b at the rear end of the top panel of main computer body 100 so as to be rotatable about the left-to-right extending rotational axis C by the first hinge portions 120a, 120b. The cover for the monitor section 300 also has a display control panel 304 installed to the right side of the flat monitor 302 including a contrast control element, a brightness control element and light emitting diode (LED) indicators for indicating the present operating state of the compact personal computer by lighting the LEDs. In addition, a locking mechanism including a hook 320 formed above a center of the flat screen 320 and a corresponding hook-in groove 112 formed at the top panel of the main computer body 100 is installed so that, when the cover for the monitor section 300 is pivoted downwardly to a closed position in which the cover for the monitor section 300 covers the top surface of the main computer body 100, the corresponding hook-in groove 112 will lock on the hook 320 to secure the cover for the monitor section 300 on the main computer body 100. Once the hook 320 as installed at the cover for the monitor section 300 is inserted into the corresponding hook-in groove 112 of the main computer body 100, the cover for the monitor section 300 is securely locked and the compact personal computer is positioned in the state of readiness for facile transportation from one location to another location for use. The cover for the monitor section 300 also has a release latch button 321 formed integrally with the hook 320 so as to allow the computer user to press such a release latch button 321 to release the hook 320 of the cover for the monitor section 300 from the corresponding hook-in groove 112 and thereby enabling the cover for the monitor section 300 to pivot to an open position in which the flat screen 302 is exposed for use.

Keyboard 200 as shown in FIG. 2 is connected between the respective second hinge portions 210a, 210b installed at a bottom end of the front panel 110 of the main computer body 100 such that the keyboard 200 is pivotable between an open position in which the keyboard 200 is exposed for use and a closed position in which the keyboard 200 covers the front panel 110 of the main computer body 100. The keyboard 200 also includes a pair of hooks 220 formed at a respective upper edge of keyboard 200 and a pair of corresponding hook-in grooves 111 is formed at a respective upper edge of front panel 110 of the main computer body 100 so as to receive the hooks 220 when the keyboard 200 is pivoted upwardly to a closed position in which the keyboard 200 covers the front panel 110 of the main computer body 100. Once the hooks 220 installed at the keyboard 200 are inserted into the corresponding hook-in grooves 111 of the front panel 110 of main computer body 100, the keyboard 200 is securely locked to the main computer body 100. The keyboard 200 has, however, a pair of release latch buttons 221 formed integrally with the hooks 220 respectively so as to allow the computer user to press such release latch buttons 221 inwardly to release the hooks 220 of the keyboard 200 from the corresponding hook-in grooves 111 and thereby enabling the keyboard 200 to open for use. As an option, the keyboard 200 may be detachable from the respective second hinge portions 210a, 210b by way of releasable pins, but remains electrically connected to the compact personal computer by, for example, a coiled cable which may be latched to the front panel 110 of the main computer body 100 so that the keyboard 200 can be removed from the main computer body 100 to accommodate the individual user's preference.

Figure 3:
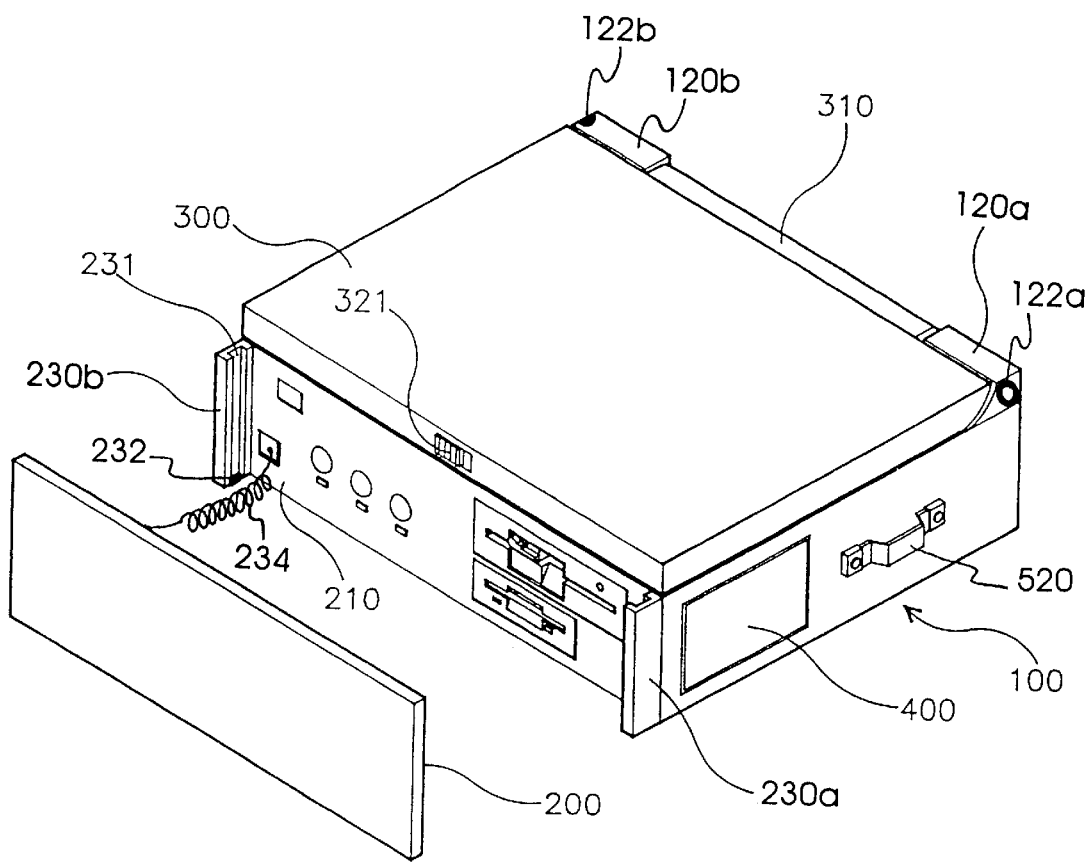
FIG. 3 is a perspective view illustrating a compact personal computer constructed as another embodiment according to the principles of the present invention.

FIG. 3 illustrates a compact personal computer constructed according to another preferred embodiment of the present invention in which, for illustrative purposes, a cover for the monitor section 300 including a flat screen 302 is folded on the main computer body 100 in a closed position and a pair of speakers 400 are pushed inwardly into corresponding receiving portions 130 of the respective side panel of main computer body 100. In this embodiment, the compact personal computer includes the same main computer body 100, the keyboard 200, the cover for the monitor section 300 including a video screen 302 and a pair of speakers 400 as shown in FIG. 2. However, the main computer body 100 is specially constructed to include a pair of holding brackets 230a, 230b arranged on each respective side of the front panel 110 of main computer body 100 in place of the second hinge portions 210a, 210b installed at a bottom end of the front panel 210 for pivotally mounting the keyboard 200 as constructed according to the first preferred embodiment shown in FIG. 2. Each of brackets 230a, 230b has a corresponding groove 231 for guiding the keyboard 200 to a closed position with respect to the main computer body 100 when the keyboard 200 is inserted into the brackets 230a, 230b. Each of brackets 230a, 230b as installed on each respective side of front panel 210 of main computer body 100 also has a corresponding stop 232 formed integrally at its bottom for holding keyboard 200 in place once keyboard 200 is pushed downwardly toward the bottom of brackets 230a, 230b. Each stop 232 may include a hook integrally constructed with a release button and keyboard 200 may include a corresponding groove that receives and, upon insertion, engages the hook when the keyboard 200 is being pressed downwardly to rest upon the stop 232 so that the keyboard 200 can be securely locked onto the main computer body 100. This locking mechanism including the hook and corresponding hook-in groove and the release button is designed to prevent the keyboard 200 from sliding out of brackets 230a, 230b during transportation of the computer from one location to another location.

When the keyboard 200 is removed from brackets 230a, 230b to an open position, its position can be varied and adjusted manually by the computer user to accommodate his or her preference. The keyboard 200 is, however, electrically connected to the compact personal computer by a flexible coiled cable 234 which is latched to the front panel 210 of the main computer body 100. A pair of adjusting screws 122a, 122b or, alternatively, a single elongated pin may be required to hold the hinge member 310 of the cover for the monitor section 300 in an aligned position with respect to the first respective hinge portions 122a, 122b installed at the rear end of the main computer body 100. The adjusting screws 122a, 122b are arranged for ease of removal and insertion of the cover for the monitor section 300 including the flat screen 302 into the main computer body 100. This is technically desirable and practical in the event where the clover for the monitor section 300 including the flat screen 302 need to be replaced.

Figure 4A:
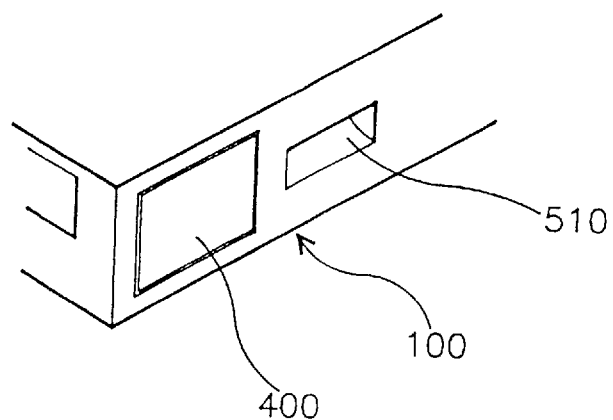
FIGS. 4A and 4B are perspective views illustrating two types of handles configured for the compact personal computers illustrated by FIG. 2 or FIG. 3.
Figure 4B:
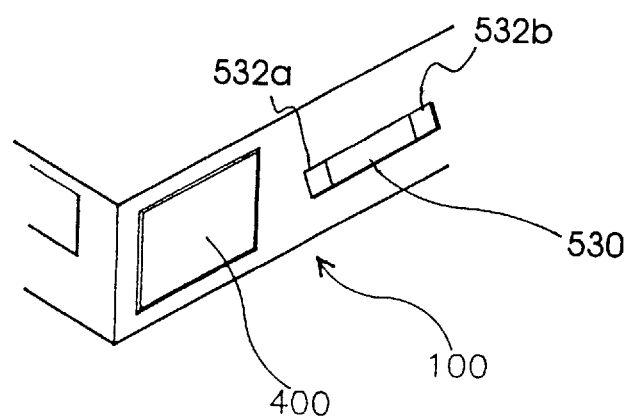

Turning now to FIGS. 4A and 4B which illustrate two different alternative embodiments of a handle formed at least on one side panel of the main computer body 100 as contemplated by the present invention. FIG. 4A illustrates a first alternative type of handle 510 which represents an upwardly sliding recess groove formed on both side panels and as part of the main computer body 100 to accommodate the insertion of the user's hand in order to allow the user to grasp the compact personal computer for facile transportation from one location to another location for use. FIG. 4B, on the other hand, illustrates a second alternative type of handle 530 which represents a heavy duty leather or plastic strap connected to the side panel of the main computer body 100 by respective fixed end bases 532a, 532b. Again, a tilt-up carrying handle (not shown) may also be pivotally provided on the side panel of the main computer body 100 so that the portable personal computer may be readily grasped and manually carried by the computer user.

Figure 5A:
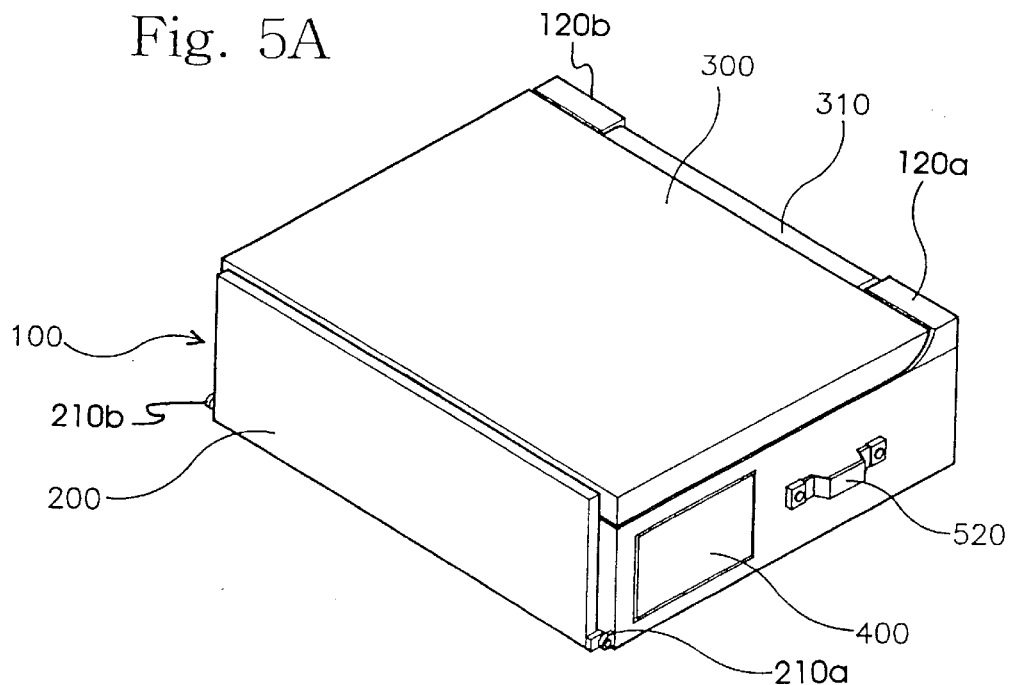
FIGS. 5A and 5B are perspective views illustrating compact personal computers of FIGS. 2 and 3 with a keyboard, a pair of speakers and a flat screen integrated into a main microcomputer body as a single specially designed portable structure.
Figure 5B:
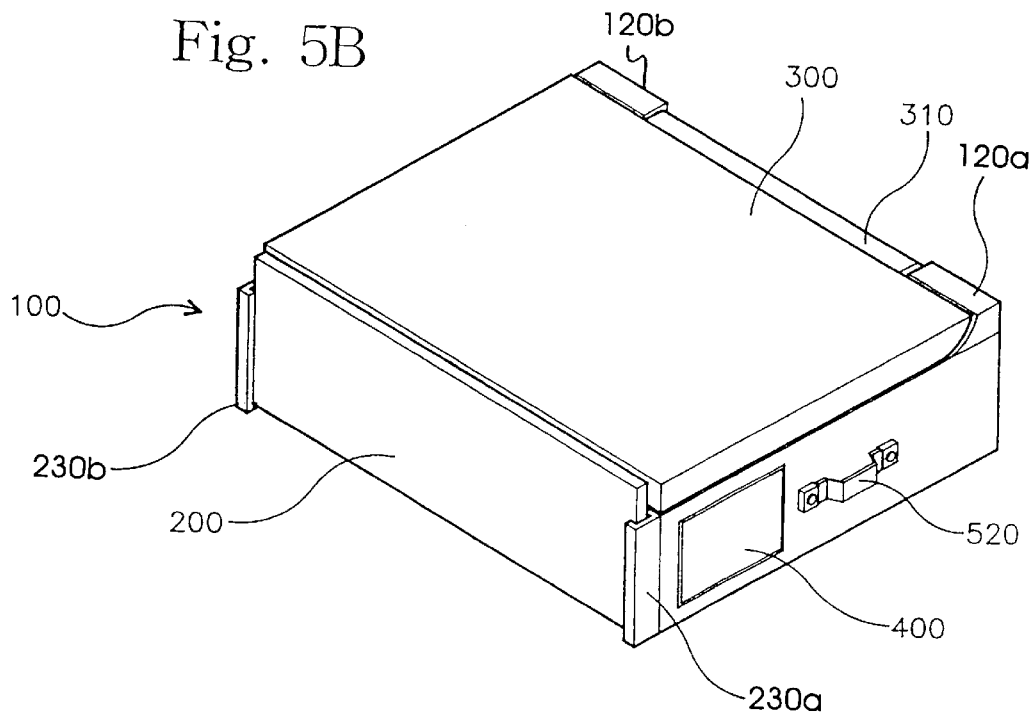

FIG. 5A illustrates a compact personal computer constructed according to the first embodiment of the invention using a ring-type carrying knob 520 and in which all of the individual hardware components such as a keyboard 200, a cover for the monitor section 300 including a flat screen 302 and a pair of speakers 400 are integrated in a single specially designed portable computer body 100 using the first, second and third respective hinge portions 120a, 120b, 210a, 210b and 410a, 410b. When the keyboard 200, the cover for the monitor section 300 and the speakers 400 are folded into the main computer body 100 in their respective closed positions, the compact personal computer constructed according to the first embodiment of the present invention is ready to be transported by the user. Similarly, FIG. 5B illustrates a compact personal computer constructed according to the second embodiment of the invention using a ring-type handle 520 and in which the keyboard 200, the cover for the monitor section 300 including a flat screen 302 and the pair of speakers 400 are integrated in a specially designed portable computer body 100 using the hinge portions 120a, 120b and 410a, 410b for pivotally mounting the cover for the monitor section 300 and the speakers 400 and brackets 230a, 230b for holding the keyboard 200 in place relative to the main computer body 100.

Figure 6A:
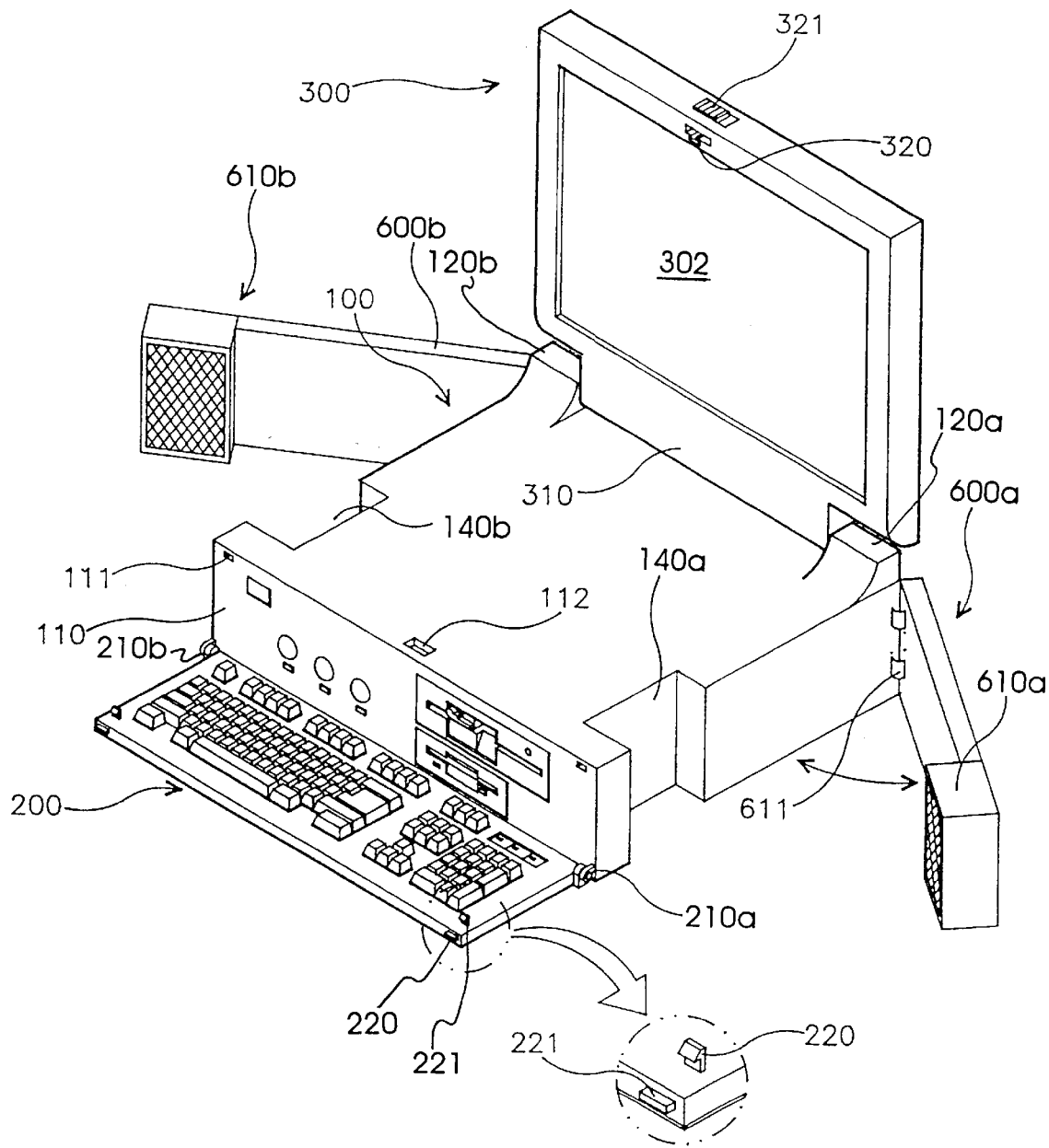
FIGS. 6A and 6B are perspective views illustrating a compact personal computer constructed as yet another embodiment according to the principles of the present invention.

Refer now to FIG. 6A which illustrates a compact personal computer constructed according to a third embodiment of the present invention. The personal computer of FIG. 6A has the same construction as that of FIG. 2 including the main computer body 100, the keyboard 200, the cover for the monitor section 300 including a flat screen 302 and the pair of speakers 400 all integrated into a single specially designed portable housing structure, except that the receiving slots 140a, 140b constructed in the opposite side walls of main computer body 100 are concave to form U-shape slots to accommodate a pair of respective box-shaped speakers 610a, 610b extendable from their respective pivotal arms 600a, 600b connected by hinges 611 to side ends of the main computer body 100. The box-shaped speakers 610a, 610b are removable from their respective pivotal arm 600a, 600b for replacement in the event audio production sounds unsatisfactory to the user.

As shown in FIG. 6A, each of the box-shaped speakers 610a, 610b extended from their respective pivotal arms 600a, 600b and are connected to the main computer body 100 by respective hinges 611 such that the speakers 610a, 610b are pivotable between an open position when the speakers 610a, 610b are pulled outwardly from their respective receiving slots 140a, 140b by the computer user in which the speakers 610a, 610b are extended therefrom for use and a closed position when the speakers 610a, 610b are pushed inwardly into their respective receiving slots 140a, 140b by the computer user in which the speakers 610a, 610b side walls containing receiving slots 140a, 140b of the respective side panels of the main computer body 100.

Figure 6B:
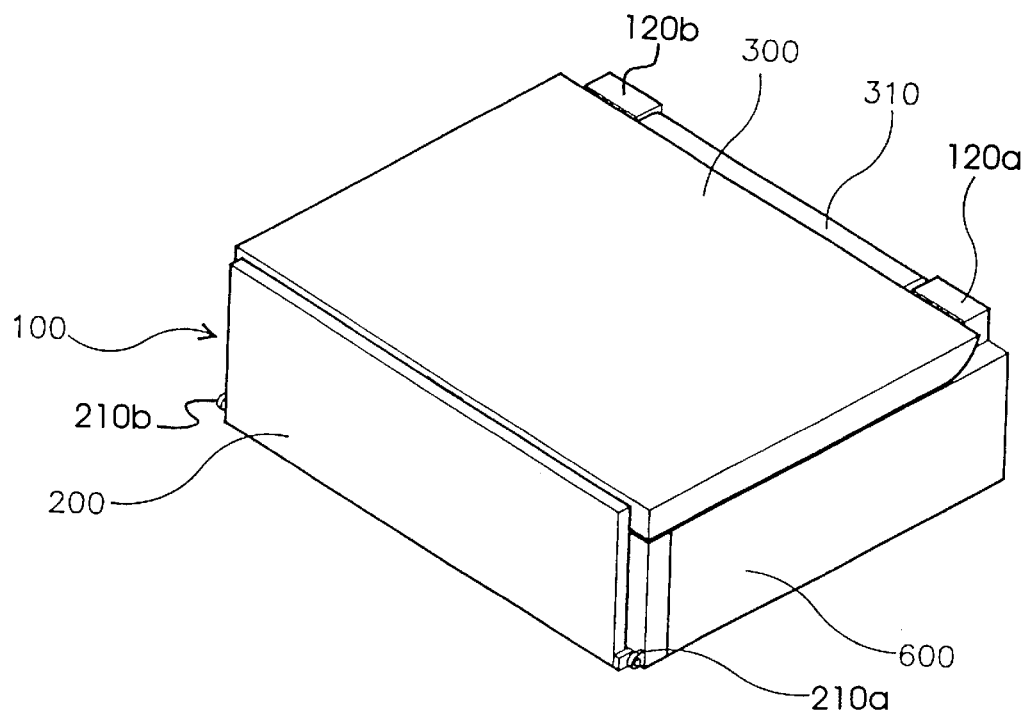

FIG. 6B illustrates a compact personal computer constructed according to the third embodiment of the invention using the extending pivotal arm 600 including the respective box-shaped speakers in which all of the individual hardware components such as a keyboard 200, a cover for the monitor section 300 including a flat screen 302 and a pair of speakers 400 that are integrated in a single specially designed portable computer body 100. As shown in FIG. 6, when the keyboard 200, the cover for the monitor section 300 and the speakers 400 are folded into the main computer body 100 in their respective closed positions, the compact personal computer constructed according to the first embodiment of the present invention forms a rectangular box that is ready to be transported by the user.

As described above, the compact personal computer constructed according to the present invention has a LCD monitor as a display and therefore is suitable for saving spaces. Also, as all individual hardware components such as the keyboard, the LCD monitor are integrated into the main computer body as a single structure, it is convenient for users to reserve and transport the computer by using a carrying knob. In addition, it is also easy for beginners to set up and operate the personal computer constructed according to the present invention because all individual hardware components thereof are coupled to a main computer body as a single structure.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A portable computer system, comprising:
    a keyboard;
    a cover containing a flat screen providing a variable video display;
    a pair of speakers; and
    a computer functionally responsive to manipulation of said keyboard, operationally driving said speakers to broadcast audio sounds and operationally driving said flat screen to provide said video display, said computer comprising:
        a housing forming a main body with a top panel, a front panel, and opposite side panels each perforated by different receiving apertures,
        a first hinge installed at a rear end of said top panel for pivotally mounting said cover on said rear end with said cover being pivotable between an open position exposing said flat screen for exhibition of said variable video display and a closed position with said cover disposed across said top panel,
        a second hinge installed between said keyboard and said front panel for pivotally mounting said keyboard with said keyboard being pivotable between an open position exposing said keyboard for use and a closed position with said keyboard covering said front panel of said main body, and
        a plurality of third hinges installed in juxtaposition to corresponding ones of said receiving apertures on each of said side panels for pivotally mounting corresponding ones of said pair of speakers with said speakers being pivotable between an open position when the speakers are deployed to extend outwardly from said corresponding ones of said receiving apertures for use and a closed position with said speakers recessed inwardly into said corresponding ones of said receiving apertures with said speakers being positioned substantially flush against corresponding said side panels of said main body;
    said keyboard, said cover, said pair of speakers and said main body forming a monolithic parallelepiped shape while said cover, said keyboard and said pair of speakers are in said corresponding closed positions.

2. The portable computer system of claim 1, further comprised of said flat screen comprising a liquid crystal display.

3. The portable computer system of claim 1, further comprising a handle formed on at least one of said side panels of the main computer body.

4. The portable computer system of claim 1, further comprising an upwardly sliding recess formed on both side panels of said main body to accommodate an insertion of a user's hand to allow the user to grasp and lift the entirety of said computer system for facile transportation.

5. The portable computer system of claim 1, further comprising:
    a first locking mechanism comprising a hook and a release button formed on said cover and a corresponding groove formed on said main body, for locking the cover section to said main body while said cover is in said closed position when said hook on said cover is pressed into the corresponding said groove of the main body into said closed position, and for unlocking said cover from said main body when said release button is depressed to release said hook from the corresponding said groove, and
    a second locking mechanism comprising a pair of hooks and release buttons formed on said keyboard and corresponding grooves formed on said front panel of said main body, for locking said keyboard to said main body while said keyboard is in said closed position when said hooks formed on said keyboard are pressed into said corresponding grooves formed on said front panel, and for unlocking said keyboard from said main body by depressing said release buttons to release said hooks from said corresponding grooves formed on said front panel.

6. The portable computer system of claim 1, with said second hinges further comprised of releasable pins accommodating detachment of said keyboard from said main body.

7. The portable computer system of claim 1, with said first hinges further comprised of releasable pins accommodating detachment of said cover from said main body.

8. The portable computer system of claim 1, with said first hinges further comprised of a first member forming part of said main body, a second member forming an integral part of said cover, and an axle coaxially extending between said first member and said second member.

9. A portable computer system, comprising:
    a keyboard;
    a cover containing a flat screen providing a variable video display;
    a pair of speakers; and
    a computer functionally responsive to manipulation of said keyboard, operationally driving said speakers to broadcast audio sounds and operationally driving said flat screen to provide said video display, said computer comprising:
        a housing forming a main body with opposite side panels perforated by different receiving apertures, said opposite side panels being spaced-apart by a top panel and a front panel,
        a first hinge installed at a rear end of said top panel for pivotally mounting said cover on said rear end with said cover being pivotable between an open position exposing said flat screen for exhibition of said variable video display and a closed position with said cover disposed across said top panel,
        a second hinge installed between said keyboard and said front panel for pivotally mounting said keyboard with said keyboard being pivotable between an open position exposing said keyboard for use and a closed position with said keyboard covering said front panel of said main body,
        a plurality of third hinges installed in corresponding ones of said receiving apertures for pivotally mounting corresponding ones of said pair of speakers with said speakers being pivotable between an open position when the speakers are deployed to extend outwardly from said corresponding ones of said receiving apertures for use and a closed position with said speakers recessed inwardly into said corresponding ones of said receiving apertures; and a pair of brackets installed on opposite sides of said front panel receiving and slidingly guiding said keyboard to a closed position covering said front panel while said keyboard is fully received between said brackets;

said keyboard, said cover, said pair of speakers and said main body forming a monolithic parallelepiped shape while said cover, said keyboard and said pair of speakers are in said corresponding closed positions.

10. The portable computer system of claim 9, further comprised of said flat screen comprising a liquid crystal display.

11. The portable computer system of claim 9, further comprising a handle formed on at least one of the side panels of the main body to allow a user to grasp and lift the entirety of said computer system.

12. The portable computer system of claim 9, further comprising an upwardly sliding recessed groove formed on both side panels of the main computer body to accommodate an insertion of a user's hand.

13. The portable computer system of claim 9, further comprising a locking mechanism including a hook and a release button formed on said cover and a conforming groove formed on said main body, for locking said cover to said main body as said hook is received within said groove while said cover is in said closed position, and for unlocking said cover from said main body by depressing said release button while said hook is within said groove.

14. The portable computer system of claim 9, further comprised of:

each of said brackets having a corresponding groove configured to receive and guide opposite sides of said keyboard to said closed position siubstantially coextensive with said front panel while said keyboard is fully received between said brackets; and a corresponding stop formed at a bottom of one of said grooves holding said keyboard in place once said keyboard is fully received between said brackets.

15. The portable computer system of claim 9, further comprising a locking mechanism including a pair of hooks and operatively associated release buttons formed on said brackets and corresponding grooves formed on sides of said keyboard, for locking said keyboard to said main body when said hooks are received with said grooves as said keyboard reaches said closed position, and for unlocking said keyboard from said main body when respective ones of said release buttons are depressed to release said hooks from said grooves.

16. The portable computer system of claim 9, with said first hinges further comprised of releasable pins accommodating detachment of said cover from said main body.

17. The portable computer system of claim 9, further comprised of said flat screen comprising a liquid crystal display.

18. A computer system, comprising:

a keyboard;

a cover containing a flat screen providing a variable video display;

a pair of speakers; and a computer functionally responsive to manipulation of said keyboard, operationally driving said speakers to broadcast audio sounds and operationally driving said flat screen to provide said video display, said computer comprising:

a housing forming a main body with a top panel, a front panel, and opposite side panels spaced-apart by said top panel, each of said side panels supporting different ones of said speakers, a first hinge installed at a rear end of said top panel for pivotally mounting said cover on said rear end with said cover being pivotable between an open position exposing said flat screen for exhibition of said variable video display and a closed position with said cover disposed across said top panel, a second hinge installed between said keyboard and said front panel for pivotally mounting said keyboard with said keyboard being pivotable between an open position exposing said keyboard for use and a closed position with said keyboard covering said front panel of said main body, and a plurality of third hinges installed between said housing and corresponding ones of said side panels for pivotally connecting said side panels to opposite sides of said housing with said speakers being pivotable between an open position when the speakers are deployed to extend outwardly from said housing for use and a closed position with said speakers recessed inwardly within said housing with said side panels extending substantially coextensively along said opposite sides of said housing;

said keyboard, said cover, said pair of speakers and said main body forming a monolithic parallelepiped shape while said cover, said keyboard and said pair of speakers are in said corresponding closed positions.

19. The computer system of claim 18, further comprised of said flat screen comprising a liquid crystal display.

20. The computer system of claim 18, further comprising a handle formed on at least one of the side panels of the main body to allow a user to grasp and portabily carry the entirety of said computer system.

21. The computer system of claim 18, further comprising an upwardly sliding recessed groove formed on both side panels of the main computer body to accommodate an insertion of a user's hand to allow the user to grasp the compact personal computer for facile transportation.

22. The computer system of claim 18, further comprising a locking mechanism including a hook and a release button formed on said cover and a conforming groove formed on said main body, for locking said cover to said main body as said hook is received within said groove while said cover is in said closed position, and for unlocking said cover from said main body by depressing said release button while said hook is within said groove.

23. The computer system of claim 18, further comprising a locking mechanism including a pair of hooks and operatively associated release buttons formed on said keyboard and conforming grooves formed on sides of said front panel, for locking said keyboard to said main body when said hooks are received with said grooves as said keyboard reaches said closed position, and for unlocking said keyboard from said main body when respective ones of said release buttons are depressed to release said hooks from said grooves.

24. The computer system of claim 23, with said first hinges further comprised of releasable pins accommodating detachment of said cover from said main body.

25. The computer system of claim 24, further comprised of said flat screen comprising a liquid crystal display.

26. A computer system, comprising:

a keyboard;

a cover containing a flat screen providing a variable video display;

a pair of speakers;

a memory drive reading information stored upon disks removable from said drive; and a computer functionally responsive to manipulation of said keyboard, operationally driving said speakers to broadcast audio sounds and operationally driving said flat screen to provide said video display, said computer comprising:

a housing forming a main body with a top panel, a front panel perforated by said memory drive, and opposite side panels spaced-apart by said top panel, each of said side panels supporting different ones of said speakers, a first retainer comprising a first hinge installed at a rear end of said top panel for pivotally mounting said cover on said rear end with said cover being pivotable between an open position exposing said flat screen for exhibition of said variable video display and a closed position with said cover disposed across said top panel, a second retainer installed on opposite sides of said front panel, receiving and guiding said keyboard between an open position fully exposing said front panel for insertion and removal of memory disks from said drive, and a closed position with said keyboard coextensively covering said front panel and completely blocking said drive, and a plurality of second hinges installed between said housing and corresponding ones of said side panels for pivotally connecting said side panels to opposite sides of said housing with said speakers being pivotable between an open position when the speakers are deployed to extend outwardly from said housing for said broadcast of audio sounds and a closed position with said speakers recessed inwardly within said housing with said side panels extending substantially coextensively along and flush with said opposite sides of said housing while said speakers are in said cloed position;

said keyboard, said cover, said pair of speakers and said main body forming a monolithic parallelepiped shape while said cover, said keyboard and said pair of speakers are in said corresponding closed positions.

27. The computer system of claim 26, with said second retainer comprised of a pair of brackets installed on opposite sides of said front panel receiving and slidingly guiding said keyboard to a closed position covering said front panel while said keyboard is fully received between said brackets.

28. The computer system of claim 26, with said second retainer comprised of a third hinge installed between said keyboard and said front panel for rotatably connecting said keyboard to said housing with said keyboard being pivotable between an open position exposing said keyboard for use and a closed position with said keyboard covering said front panel of said main body.

* * * * *